June 24, 1941.  R. W. GLASNER ET AL  2,246,673
DRIVING MECHANISM
Filed March 7, 1940          5 Sheets-Sheet 4
FIG. 4.
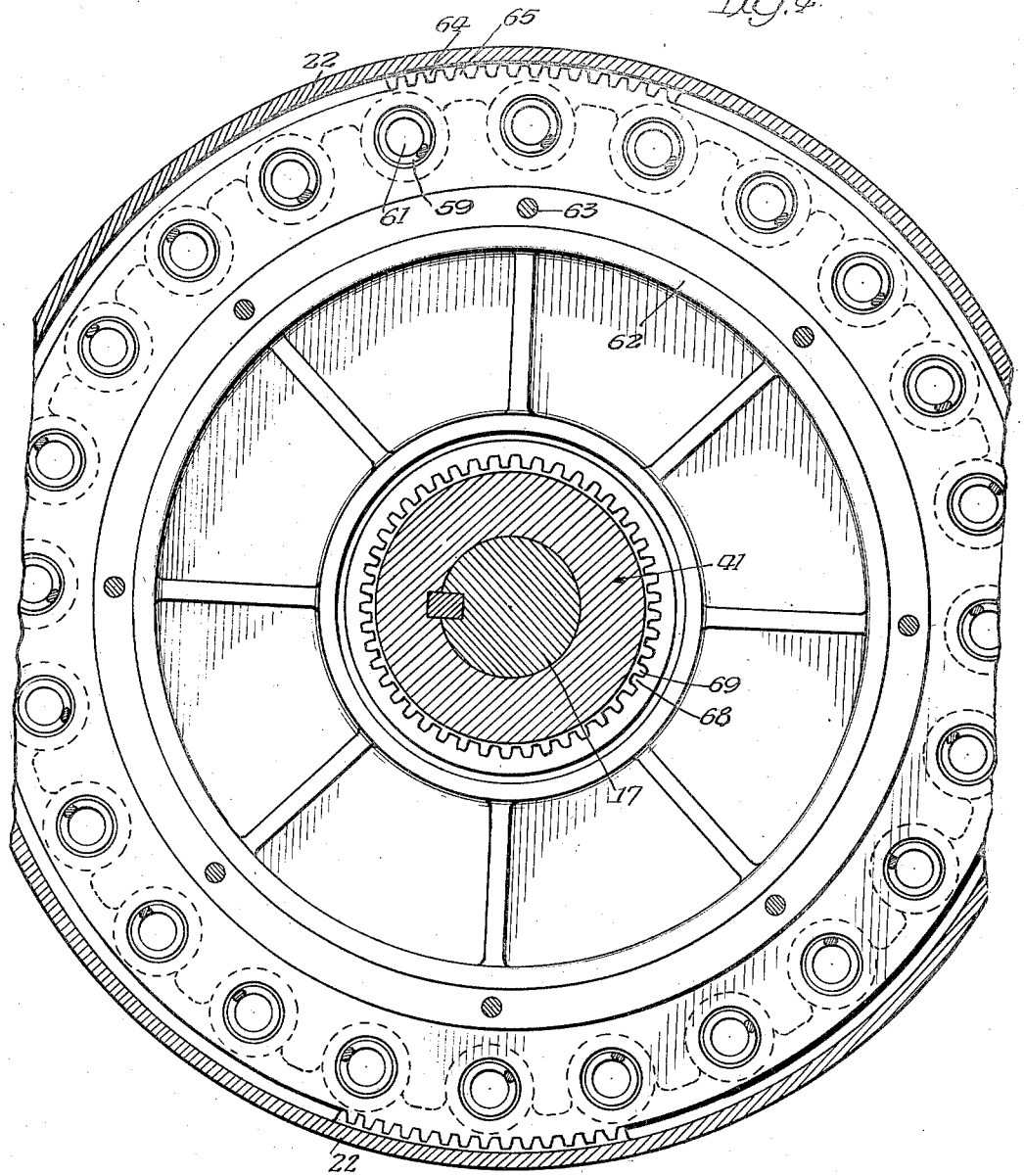
Inventor
Rudolph W. Glasner
Einar K. Johansen

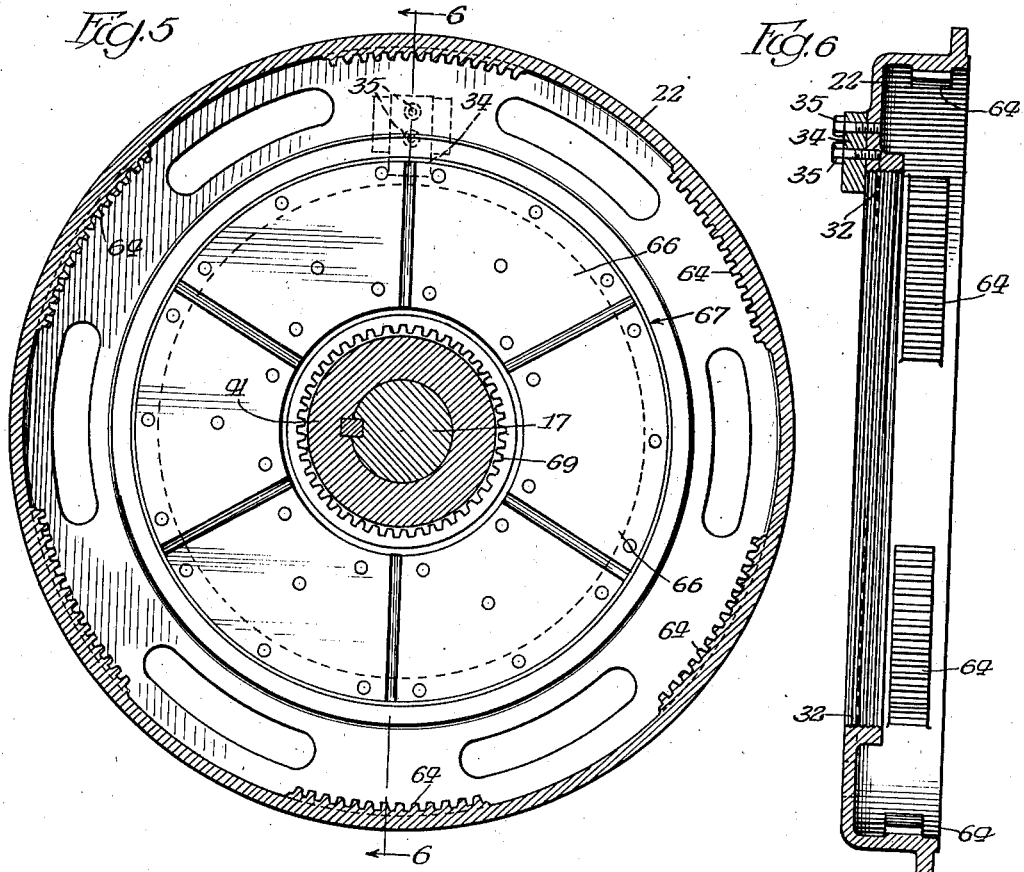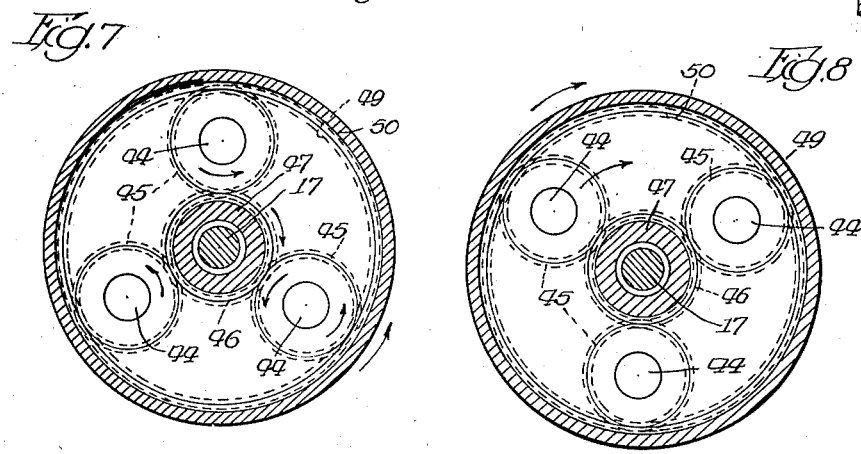

Patented June 24, 1941

2,246,673

UNITED STATES PATENT OFFICE 2,246,673

DRIVING MECHANISM

Rudolph W. Glasner and Einar K. Johansen, Chicago, Ill.; said Johansen assignor to said Glasner Application March 7, 1940, Serial No. 322,722

7 Claims. (Cl. 74—291)

This invention relates to improvements in combined driving mechanism and one of the objects of the invention is to provide an improved mechanism of this character in which a plurality of brakes are embodied in the same unit, the mechanism being fluid actuated, thereby adapting the same for efficient use in connection with power presses where the instantaneous stopping and braking after one stroke of the press is necessary, and where such an apparatus or mechanism must be so constructed that it will operate with precision and speed many times per minute under high pressure requirements, and at the same time the mechanism will be compactly arranged and may be of a minimum size.

A further object is to provide in an improved structure of this character a gear ratio for reducing the speed of the press drive shaft without reducing the speed of rotation of the fly wheel, and in which structure intermediary shafts carrying intermediary gears and pinions will be eliminated, with a further result that the mechanism will necessitate a minimum amount of space.

A further object is to provide a fluid pressure operated mechanism of this kind in which the cylinder that comprises a part of the fluid pressure clutch will always remain stationary, thereby eliminating the necessity of special fittings to provide passages and seals for the flow of fluid pressure.

A further object is to provide an improved mechanism of this character in which the adjustable element, or parts are stationary, thereby not only rendering it possible to construct driving mechanism of a comparatively small size but to also obviate the necessity of stopping a large mass of rotary members, and at the same time produce a mechanism of this character which will be extremely sensitive and quick in operation.

A still further object is to provide an improved structure of this character in which adjustment may be made while the fly wheel is in motion or while the press is in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in side elevation and partly in longitudinal section and with parts omitted, of a mechanism of this character constructed in accordance with the principles of this invention.

Figure 4 is a vertical sectional view taken on line 4—4 Figure 2.

Figure 5 is a vertical sectional view taken on line 5—5 Figure 2, on a reduced scale.

Figure 6 is a sectional view taken on line 6—6 Figure 5.

Figures 7 and 8 are views partly in diagram and partly in section illustrating the operation of the gear connection between the shaft and fly wheel.

Figure 9 is a detail sectional view taken on line 9—9 Figure 1 showing the manner in which the stationary member of the clutch and brake may be supported.

Figure 1:
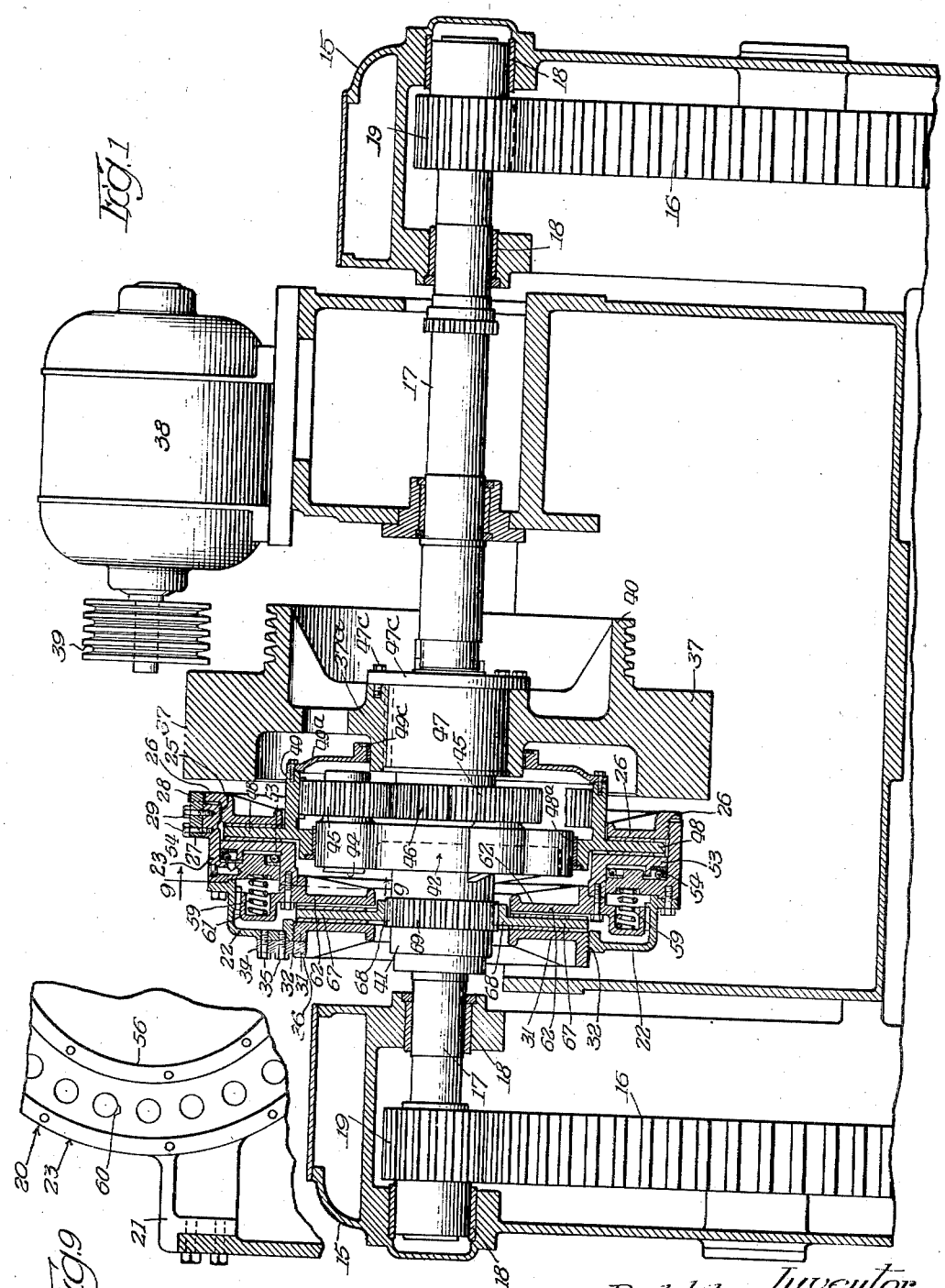
Figure 2:
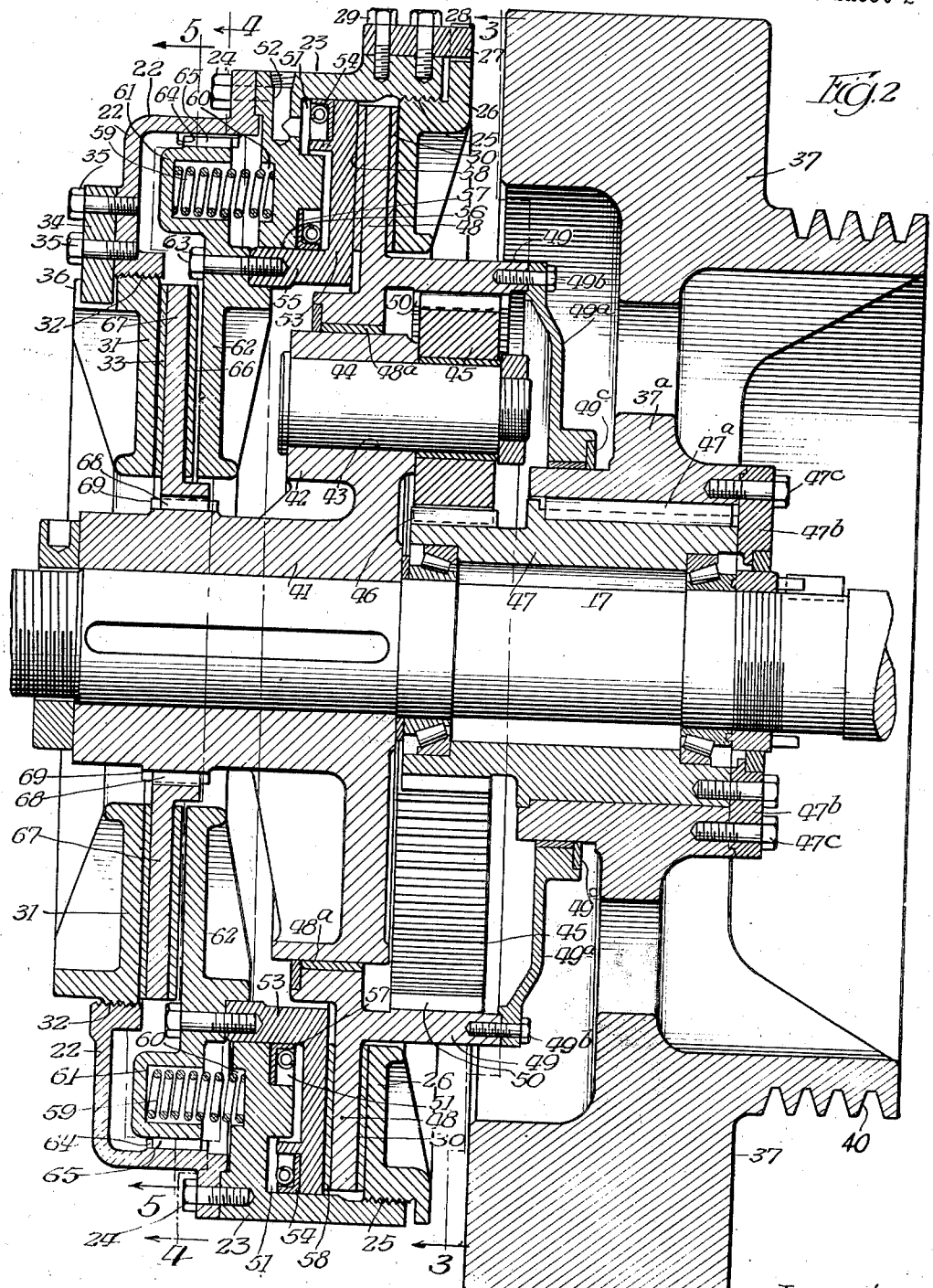
Figure 2 is an enlarged longitudinal sectional view of the clutch and brake mechanism.
Figure 3:
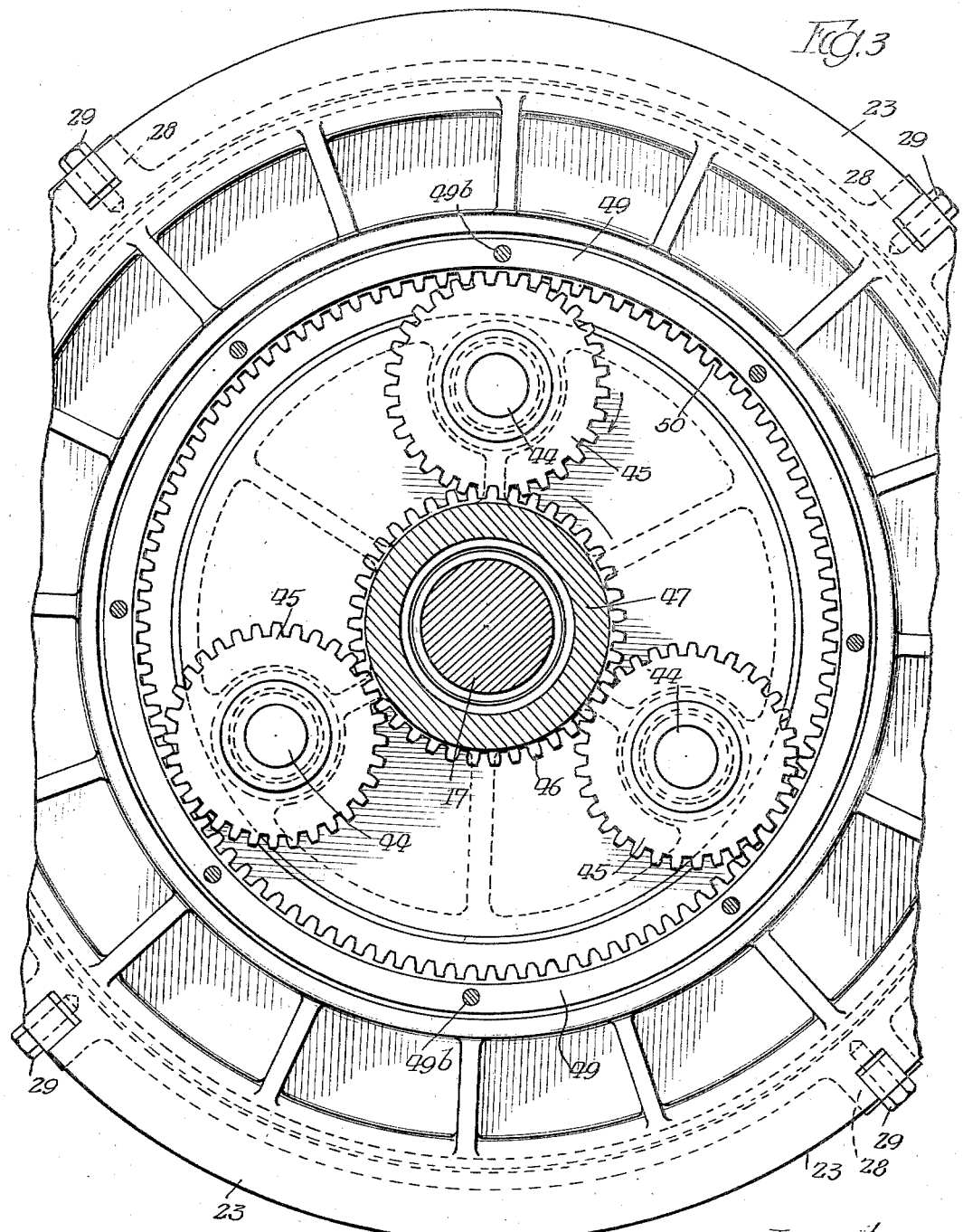
Figure 3 is a detail vertical sectional view taken on line 3—3 Figure 2.

In the present exemplification of this invention the driving mechanism is shown in connection with a power press. The numerals 15 designate the uprights of the press in which are arranged gears 16, which latter, through mechanism not disclosed, will upon rotation, transmit a reciprocatory motion to the slide of the press.

A shaft 17 is journaled in suitable bearings 18 in the walls of the respective uprights and mounted upon this shaft for rotation therewith are pinion gears 19 which mesh with the respective gears 16 imparting rotation thereto, all as well known in this art.

An annular member designated generally by the reference numeral 20 in Figure 9 is disposed between the uprights 15 preferably in proximity to one of them and this member 20 is provided with arms or extensions 21 which form a support therefor, and which latter themselves are supported in any suitable manner. The shaft 17 passes through the annular member.

This annular member is preferably of a sectional construction and comprises a brake disc ring 22 that is secured to another annular member 23 in any desired or suitable manner such as by means of fastening screws or bolts 24.

Secured to the annular member 23 preferably by means of threads 25 is a friction element carrying member 26 having a seat 28 opening through its periphery to receive a locking member 27 that is secured by means of bolts or screws 29 to the member 23, the locking member 27 serving to prevent rotation of the element 26 with respect to the member 23.

This member 26 is also annular and carries on its inner face friction creating means 30.

When it is desired to adjust the member 26 to compensate wear of the friction elements the bolts 29 and the locking element 27 may be removed and the member 26 rotated with respect to the member 23. When the desired adjustment has been obtained the locking member 27 is replaced and also the bolts 29. Obviously there may be provided around the periphery of the member 26 any desired number of recesses 28.

The brake disc ring 22 also supports another friction element carrying member 31 which is secured thereto by means of threads 32. This member 31 has secured to one face thereof friction creating means 33 and the member 31 is held against rotation with respect to the brake disc ring 22 by means of a locking element 34 similar to the element 28 and is held in position by fastening bolts 35, the element 34 projecting into a recess 36 in the member 31.

Rotatably mounted upon the shaft 17 is a fly wheel 37 which is driven in any suitable manner preferably from a motor 38 to the shaft of which is connected a drive pulley 39 over which a drive belt (not shown) passes, and the belt also passes over a pulley portion 40 on the fly wheel 37.

A hub 41 is secured to the shaft 17 for rotation therewith and this hub is provided with a radial flange 42 having bearing openings 43 therein which are spaced from and encompass the shaft 17. Mounted in these bearings 43 are pins or stub shafts 44 and carried by the shafts are pinion or planet gears 45. Any number of these gears 45 and their mountings may be provided but in the present exemplification of this invention three are shown and are arranged so that they will encompass the shaft 17.

These gears 45 mesh with teeth on a sun gear 46 on the hub or collar 47 connected to the fly wheel 37 and which hub encompasses the shaft 17.

An orbit gear 49 provided with a flange or friction disc 48 is rotatably supported by the hub 41 preferably by being supported by the flange 42 and this gear 49 is provided with a hollow hub portion having internal teeth 50, with which the planet pinions 45 mesh so that when the fly wheel 37 is rotated the sun gear 46 of the hub 47 which meshes with the planet gears 45 will rotate the latter and these gears in turn meshing with the teeth 50 of the hub portion of the gear 49 will cause the latter to be rotated by the fly wheel but at a different rate of speed with respect thereto. The flange 48 of the gear 49 stands in proximity to the friction creating means on the stationary member 26. Within the member 23 is formed a cylinder 51 that is adapted to receive fluid pressure from any suitable source (not shown) through an opening 52.

Within the cylinder 51 is a piston 53 having suitable packing 54 and the piston is provided with a tubular portion 55 that extends through an opening 56 in the wall of the cylinder, suitable packing 57 being provided for the tubular portion 55.

Carried by the piston 53 is friction creating means 58 that is adapted to co-operate with the friction creating means 30 on the member 26 for gripping the flange 48 of the hub 49 and thereby retard the rotation of the flange or disc 48 with the result that the rotation of the shaft 17 by the fly wheel 37 will be controlled.

When the disc 48 is not clamped by the friction means then the intermediary gears will cause the disc 48 and the orbit gear 49 to rotate on the member 41, but in a direction opposite to that of the fly wheel. That is, the disc 48 and the orbit gear 49 will be freely rotated by the fly wheel through intermediary gear connection.

When, however, the disc 48 is clamped by the member 26 and the piston 53, the motion of the disc and the orbit gear 49 will be retarded and this will cause rotation of the hub 41 and the drive shaft 17. The shaft 17 will then rotate in the same direction as the fly wheel 37 but at a reduced speed with respect to the speed of the fly wheel.

The piston 53 is moved in one direction to effect such gripping of the disc by the admission of fluid pressure into the cylinder through the opening 52 and as long as this pressure is sufficient, the disc 48 and orbit gear 49 will be thus gripped. When, however, the fluid pressure is reduced, the piston 53 will be moved into the opposite direction or in a direction to release the disc 48 and the orbit gear 49. This latter movement may be effected by means of springs 59, any number of which may be provided. One end of the springs are seated in recesses 60 in the wall of the cylinder 51. The other end of the springs are seated in recesses 61 in a brake disc ring 62 which latter encompasses the hub 41 and is secured to the piston 53 by means of bolts or screws 63 so as to cause the brake disc ring 62 to move in unison with the piston 53.

In order to prevent the brake disc ring 62 from rotating there may be provided on the member 22 any number or series of teeth 64 which are engaged by teeth 65 on the brake disc ring. These teeth while preventing the brake disc ring 62 from rotating will permit of a lateral movement of the brake disc ring with the piston.

Friction creating means 66 is carried by a brake disc 67 that is supported by the hub 41 for rotation therewith and this friction means stands between the member 31 and the brake disc ring 62. This disc 67 is mounted for lateral adjustment on the hub 41 in the direction of the axis of the latter preferably through the medium of teeth 68 on the disc which mesh with teeth 69 on the hub, the teeth being of such construction as to permit of this lateral movement while maintaining the disc for rotation with the hub.

With this construction it will be manifest that the member 26 and the member 31 are stationary and each respectively constitutes one of the elements of a brake mechanism. The member 53, which in the present instance is the piston, co-operates with the member 26, while the brake disc ring 62 which is connected with the piston 53 for movement therewith, co-operates with the stationary member 31 to clamp the disc 67 to constitute a brake.

The springs 59 tend normally to move the piston 53 away from the member 26 to release the disc 48 and to move the brake disc ring 62 toward the member 31 to clamp the disc 67 to constitute a brake, and it will be manifest that with this construction the driving mechanisms and the brake mechanism operate in opposition to each other.

The springs 59 tend normally to move the piston 53 in a direction away from the member 26 to release the disc 48, and to move the brake disc ring 62 toward the member 31 to co-operate therewith to clamp the disc 67, thereby rendering the brake active.

When, however, fluid pressure is admitted into the cylinder 51 through the opening 52, the piston 53 will be moved against the stress of the springs 59 and toward the member 26 to clamp the disc 48 or orbit gear 49 to render the brake active. As the piston 53 is moved in that direction the brake disc ring 62 will be moved in a direction away from the member 31 to release the brake. When fluid pressure is relieved, then the springs 59 will effect an opposite operation, that is, the brake ring 62 will be moved toward the member 31 to clamp the disc 67, while the piston 53 will be moved in a direction away from the member 26 to release the disc 48 and thereby render the brake inactive.

With this construction it will be manifest that the cylinder and piston will be maintained stationary, that is, against rotation at all times and all adjustment for compensating wear may be effected while the fly wheel or the shaft, or both, are in operation.

It will also be manifest that there is provided a compact unitary structure in which many of the shafts and gears of prior construction are dispensed with.

With this improved construction the friction creating means or the linings may be carried either by the discs themselves or by the clamping member.

A shield 49a may be provided for the gears and this shield may be fastened by means of bolts 49b to the edge of the hub portion 49. The shield encompasses and has bearing upon the hub 37a of the fly wheel 37, and packing material 49c may be provided between the shield and the said hub. Similarly packing 48a may be provided between the flange 48 and the drive hub 41. The fly wheel 37 may be fastened to the hub 47 in any suitable manner, such as by means of keys 47a and a closure bearing plate 47b encompasses the shaft 17 and may be secured by means of suitable fastening bolts 47c to the hub 37a.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A driven shaft, a fly wheel mounted upon the shaft for rotation with respect thereto, a sun gear connected with said fly wheel, a support also mounted upon said shaft for rotation therewith, a rotatable orbit gear, gear connections between said orbit and sun gears, a brake element, carried by said orbit gear, a second brake element connected with said shaft for rotation therewith, additional brake elements co-operating with the first said brake element for controlling the rotation of said orbit gear, additional brake elements co-operating with the first said brake element for controlling the rotation of said driven shaft, means for causing said brakes to become active and inactive in opposition to each other, and means for controlling the operation of the said brakes, the last recited means embodying cylinder and piston elements housed within the brake elements.

2. A driven shaft, a fly wheel mounted upon the shaft for rotation with respect thereto, a sun gear connected with said fly wheel, a support also mounted upon said shaft for rotation therewith, a rotatable gear, gear connections between said orbit and sun gears, a brake element carried by said orbit gear, a second brake element connected with said shaft for rotation therewith, additional brake elements co-operating with the first said brake element for controlling the rotation of said orbit gear, additional brake elements co-operating with the said second brake element for controlling the rotation of said driven shaft, means for causing the brakes to become active and inactive in opposition to each other, means for controlling the operation of the said brakes, and power transmitting means connected with shaft on both sides of said fly wheel and brake mechanisms.

3. A driven shaft, a fly wheel mounted upon the shaft for rotation with respect thereto, a sun gear connected with said fly wheel, a support also mounted upon said shaft for rotation therewith, a rotatable orbit gear, gear connections between said orbit gear and said sun gear, a brake element carried by said orbit gear, a second brake element connected with said shaft for rotation therewith, additional brake elements co-operating with the first said brake element for controlling rotation of the said orbit gear, additional brake elements co-operating with the said second brake element for controlling the rotation of said driven shaft, means for causing the brakes to become active and inactive in opposition to each other, and fluid pressure controlled mechanism for controlling the operation of the brakes.

4. A driven shaft, a fly wheel mounted upon the shaft for rotation with respect thereto, a support mounted upon said shaft for rotation therewith, an operative connection between said support and said shaft and embodying a rotatably mounted orbit gear, means for locking said orbit gear against rotation with respect to said shaft, the said means embodying a radial flange carried by said orbit gear, a brake element connected with the shaft for rotation therewith, slidable friction creating means cooperating with said flange to lock said orbit gear for controlling the rotation of said gear, slidable friction creating means cooperating with said brake element for controlling the rotation of said shaft, connections between said locking means and said friction creating means to cause them to operate in opposition to each other, and means common to the brake and the said locking means for controlling them.

5. A driven shaft, a fly wheel mounted upon the shaft for rotation with respect thereto, a support mounted upon said shaft for rotation therewith, an operative connection between said support and said shaft and embodying a rotatably mounted orbit gear, means for locking said orbit gear against rotation with respect to said shaft, the said means also operable to permit rotation of the orbit gear with respect to the shaft, a brake element connected with the shaft for rotation therewith, friction creating means cooperating with said brake element for controlling the rotation of said shaft, connections between said locking means and said friction creating means to cause them to operate in opposition to each other, and fluid pressure controlled means common to the said locking means and the brake mechanism for controlling them.

6. A driven shaft, a fly wheel mounted upon the shaft for rotation with respect thereto, a support mounted upon said shaft for rotation therewith, an operative connection between said support and said shaft and embodying a rotatably mounted orbit gear, means for locking said orbit gear against rotation with respect to said shaft, the said means also operable to permit rotation of the orbit gear with respect to the shaft, a brake element connected with the shaft for rotation therewith, friction creating means cooperating with said brake element for controlling the rotation of said shaft, connections between said locking means and said friction creating means to cause them to operate in opposition to each other, fluid pressure controlled means common to said locking means and the brake mechanism for controlling them, and power transmitting means connected with said shaft on both sides of said fly wheel, locking means and brake mechanism.

7. A driven shaft, a fly wheel mounted upon the shaft for rotation with respect thereto, a sun gear connected with said fly wheel, a support also mounted upon said shaft for rotation therewith and embodying an orbit gear, planet gear connections between said orbit gear and sun gear, a brake element carried by said orbit gear and with which orbit gear said planet gears mesh for rotating said brake element, a brake element connected with said shaft for rotation therewith, additional brake elements co-operating with the first said brake element for controlling the rotation of said orbit gear, additional brake elements co-operating with the said brake element that is connected with the shaft for controlling the rotation of said shaft, means for causing said brakes to become active and inactive in opposition to each other, means for controlling the operation of the said brakes, and means whereby adjustments may be made in the brake mechanisms while the rotation of said fly wheel remains uninterrupted.

RUDOLPH W. GLASNER.
EINAR K. JOHANSEN.